United States Patent [19]

Smith

[11] Patent Number: 5,327,994
[45] Date of Patent: Jul. 12, 1994

[54] TREE SEAT

[76] Inventor: Michael P. Smith, 19 Maple St., Canisteo, N.Y. 14823-1354

[21] Appl. No.: 102,292

[22] Filed: Aug. 5, 1993

[51] Int. Cl.$^5$ ............................................. A01M 31/02
[52] U.S. Cl. ...................................... 182/187; 182/92; 182/223
[58] Field of Search .................... 182/187, 188, 133.7, 182/136, 92, 223

[56] References Cited

U.S. PATENT DOCUMENTS

| | | | |
|---|---|---|---|
| 2,775,489 | 12/1956 | Hagadorn | 182/187 X |
| 4,445,591 | 5/1984 | Mitchell | 182/187 |
| 4,605,097 | 8/1986 | Maxwell | 182/187 X |
| 4,730,700 | 3/1988 | Muller et al. | 182/187 |
| 4,987,972 | 1/1991 | Helms | 182/187 |

Primary Examiner—Alvin C. Chin-Shue
Attorney, Agent, or Firm—Gary Alan Culliss

[57] ABSTRACT

A portable, rectangularly shaped tree seat for hunters and outdoorsmen that may be used to sit between the two trunks of a double trunk tree. The tree seat may then be secured in its elevated position by straps that encompass each trunk. To utilize the tree seat while on the ground, the device may be leaned against a tree trunk and secured to the trunk with a strap. The seat area may then be pivotably released from stowage to form a resting area for objects or a seating area for a user.

12 Claims, 4 Drawing Sheets

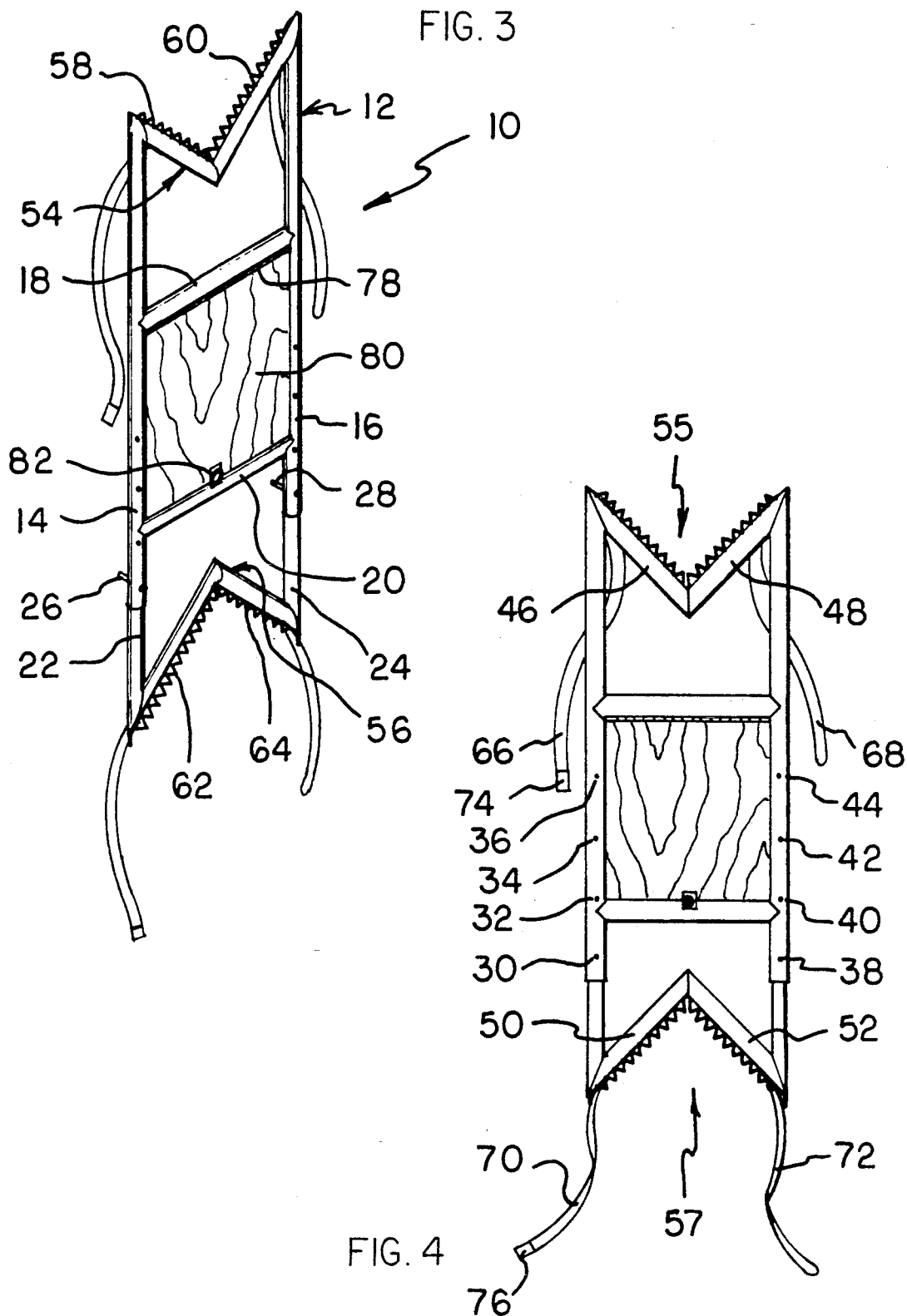

TREE SEAT

BACKGROUND OF THE INVENTION

1. Field of the Invention

The present invention relates to tree seats and more particularly pertains to tree seats which may be utilized between the two trunks of a double trunk tree.

2. Description of the Prior Art

The use of tree seats of the type which are attachable to single tree trunks is well known in the prior art. By way of example, a tree seat that can be fastened to a single tree trunk may be seen in U.S. Pat. No. 4,113,058. This tree seat, which is representative of the prior art, includes a main body that may be attached to a tree by a chain which circumscribes the tree. Pivoting outward from the main body is a seat area that may be locked into a horizontal position so as to be used as a seat.

A similar tree seat may also be seen in U.S. Pat. No. 4,600,081 which encompasses the same basic idea of the foregoing patent but includes two spikes that are incorporated into the main body so as to engage the trunk of the tree thereby increasing the stability of the device.

The tree seats previously mentioned can only be attached to a single tree trunk and cannot be used to engage both trunks of a double trunk tree. In addition, the tree seats heretofore mentioned do not include the ability to be leveled when used near the ground. The vertical alignment of the attaching tree trunk dictates the alignment of the foregoing tree seats thereby necessitating the careful selection of a nearly perfect vertical attaching tree.

In this respect, the tree seat according to the present invention substantially departs from the conventional concepts and designs of the prior art, and in so doing provides an apparatus primarily developed for the purpose of sitting between the two vertical trunks of a double trunk.

Therefore, it can be appreciated that there exists a continuing need for new and improved tree seats which can be utilized between the two upwardly projecting trunks of a double trunk tree as well as in a level position on the ground. In this regard, the present invention substantially fulfills this need.

SUMMARY OF THE INVENTION

In view of the foregoing disadvantages inherent in the known types of tree seats now present in the prior art, the present invention provides an improved tree seat construction wherein the same can be utilized to sit between the two upwardly projecting members of a double trunk tree. As such, the general purpose of the present invention, which will be described subsequently in greater detail, is to provide a new and improved tree seat apparatus and method which has all the advantages of the prior art tree seats and none of the disadvantages.

To attain this, the present invention essentially comprises a rectangularly shaped, tubular body formed with V-shaped engaging contours at opposite ends so as to partially encompass the inner lining of each upwardly projecting member of a double trunk tree. The device is also provided with straps which encompass each tree trunk to impart additional support. The area between a pair of tubular frame members is bridged with a support to form a seating area. The tree seat may also be used in a vertical position by positioning one V-shaped contoured end on the ground while allowing, at a somewhat large angle from the horizontal, the upwardly projecting frame to engage the other V-shaped contoured area with the tree bark. A securing strap may then be secured around the engaged tree trunk to increase the stability of the device. The seat area may then be pivotably released from stowage to form an outwardly projecting support that may be used as a resting area for objects or as a seating area for a user.

A second embodiment of the present invention includes a means of adjusting the contoured areas utilized for tree engagement. The adjustment means includes the ability to size the contoured ends of the device for smaller trees as well as to create clamping pressure upon the supporting tree trunk so as to further the stability of the device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree seat which has all the advantages of the prior art tree seats and none of the disadvantages.

It is another object of the present invention to provide a new and improved tree seat which may be easily and efficiently manufactured and marketed.

It is a further object of the present invention to provide a new and improved tree seat which is of a durable and reliable construction.

An even further object of the present invention is to provide a new and improved tree seat which is susceptible of a low cost of manufacture with regard to both materials and labor, and which accordingly is then susceptible of low prices of sale to the consuming public, thereby making such tree seats economically available to the buying public.

Still yet another object of the present invention is to provide a new and improved tree seat which provides in the apparatuses and methods of the prior art some of the advantages thereof, while simultaneously overcoming some of the disadvantages normally associated therewith.

Still another object of the present invention is to provide a new and improved tree seat that may be positioned between the two trunks of a double trunk tree.

Yet another object of the present invention is to provide a new and improved tree seat that may be placed in a level position when leaned against a tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric view of a first embodiment of a tree seat comprising the present invention.

FIG. 4 is a front elevation view of the first embodiment.

DESCRIPTION OF THE PREFERRED EMBODIMENT

Figure 1:
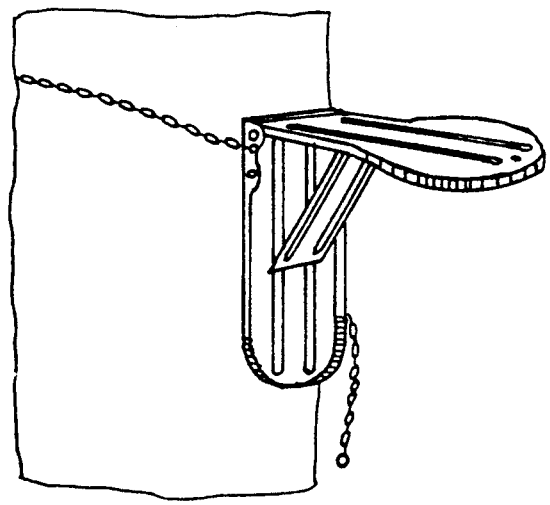
FIG. 1 is a perspective view of relevant prior art consisting of a tree seat attached to a tree.

With reference now to the drawings, and in particular to FIGS. 3 and 4 thereof, a first embodiment of a new and improved tree seat embodying the principles and concepts of the present invention and generally designated by the reference numeral 10 will be described.

Figure 2:
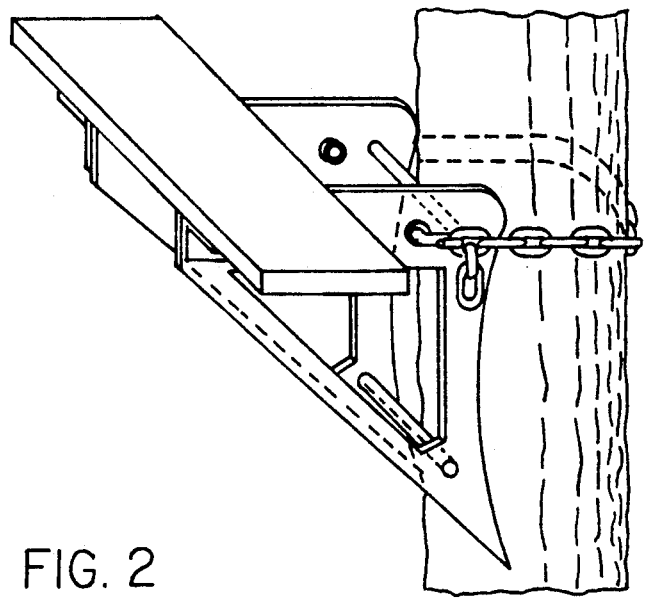
FIG. 2 is a perspective view of further relevant prior art consisting of a tree seat attached to a tree.

Initially however, reference is made to FIGS. 1 and 2 of the drawings which are illustrative of the current state of the art in tree seats. More particularly, FIG. 1 shows a tree seat including a main body that may be attached to a tree by a chain that circumscribes the tree. Pivoting outward from the main body is a seat area that may be locked into a horizontal position so as to be used as a seat.

FIG. 2 displays a tree seat that encompasses the same basic idea of the foregoing tree seat but it also includes two spikes incorporated into the main body to engage the trunk of the tree thereby increasing the stability of the device.

The tree seats shown in FIGS. 1 and 2 are representative of a far larger number of available or known tree seats which are particularly designed to be used with a single trunk tree. These types of tree seats are by their nature substantially unstable and dangerous to use under many conditions. They are illustrative of the need for more stable and safe tree seats, and this need is addressed by the present invention 10.

Referring now to FIGS. 3 and 4, it will be noted that the tree seat 10 comprising the present invention includes a frame 12 that is formed by parallelly aligned main support members 14, 16 rigidly connected together by cross members 18, 20. Sliding frame members 22, 24 are of the size necessary to facilitate snug but movable insertion into open respective ends of the main support members 14, 16 and are selectively secured in place by respective pins 26, 28 which are inserted through two of the eight symmetrically spaced openings 30-44 provided in the main support members 14, 16.

Figure 8:
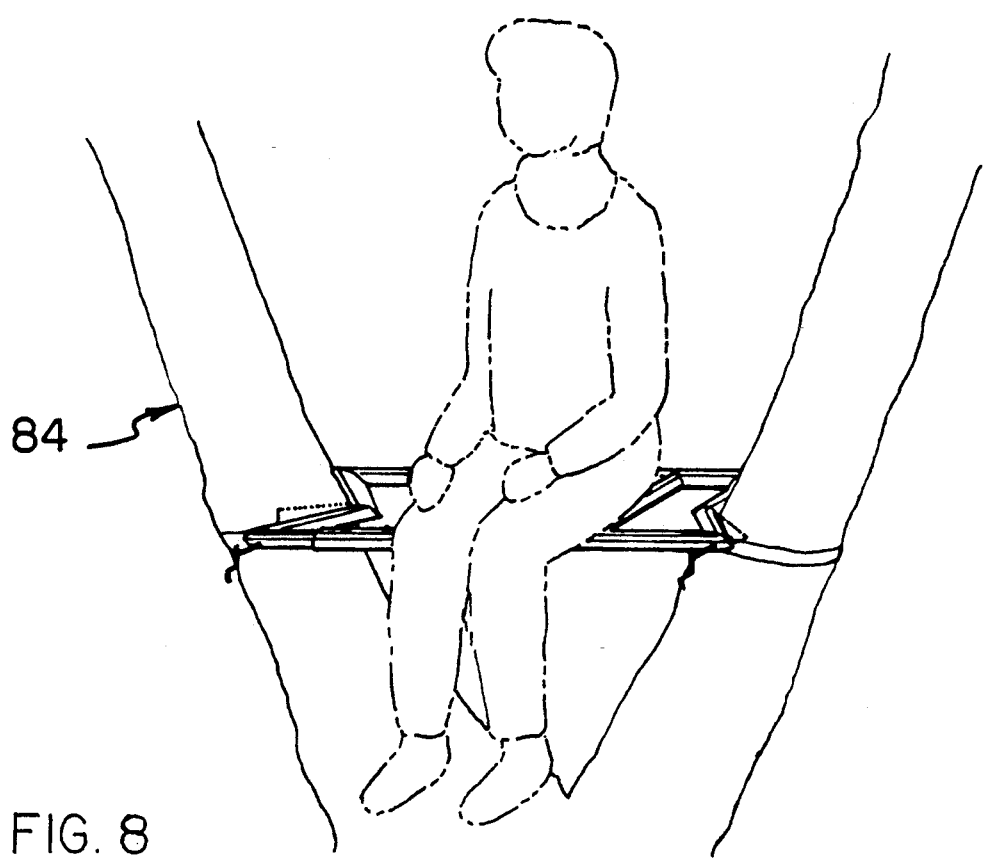
FIG. 8 is a view of the invention utilized as a tree seat.

The ends of the main support members 14, 16 opposite of the ends having the symmetrically spaced openings 30-44 are fixedly joined to respective end members 46, 48, said end members being also fixedly attached to each other so as to define a V-shaped contour 54 at a top end 55 of the frame 12. The exposed ends of the sliding frame members 22, 24 are similarly fixedly joined to respective end members 50, 52, said end members being also fixedly attached to each other so as to define a further V-shaped contour 56 at a bottom end 57 of the frame 12. The V-shaped contours 54 and 56, constructed at opposed ends of the frame 12 include respective serrated blades 58, 60 and 62, 64 rigidly attached to the interior of the angle formed by respective end members 46, 48 and 50, 52. Near the defining outer corners of the frame 12 are attached straps 66, 68, 70, and 72 which, in actual use as shown in FIG. 8, may be fitted around a tree 84 and secured by respective buckles 74, 76 in a well understood manner.

Figure 7:
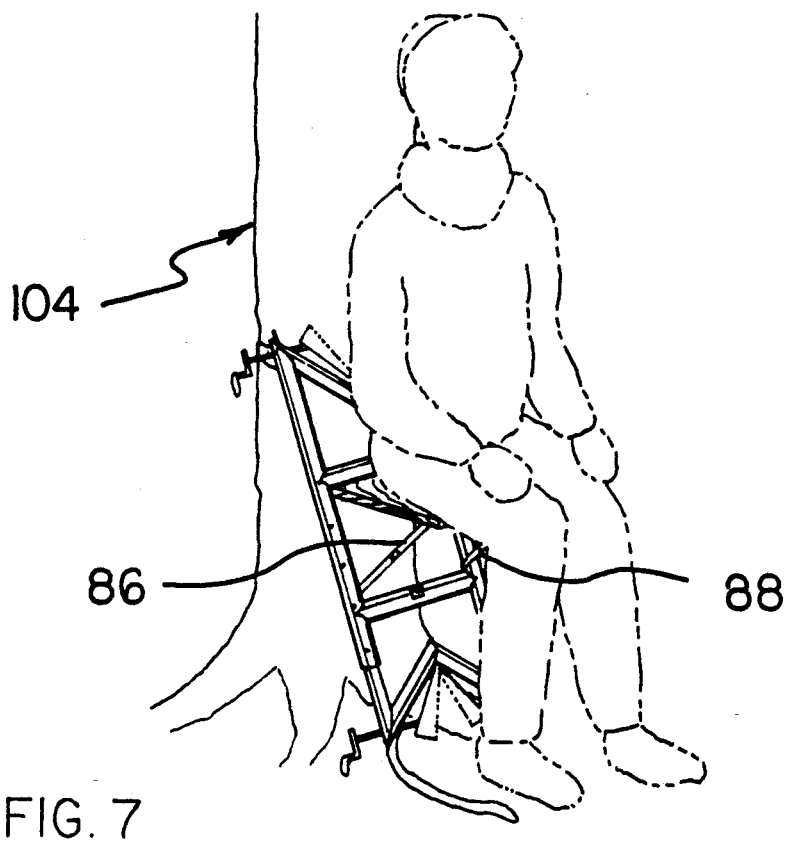
FIG. 7 is a view of the invention as utilized in a manner that allows seating near the ground.

In the approximate center of the frame 12 and pivotally attached with a hinge 78 to the cross member 18 is a seat 80 including a latch 82 that may be engaged to the cross member 20. Once the seat 80 is unlatched from the cross member 20 and pivoted away from the cross member, it is limited in its motion and secured in its maximum auxiliary support position by support braces 86, 88 as best shown in FIG. 7. Further referencing FIG. 7, the tree seat 10 may be leaned against a tree 104, secured to the tree with straps 66, 68 and utilized as a seat.

Figure 5:
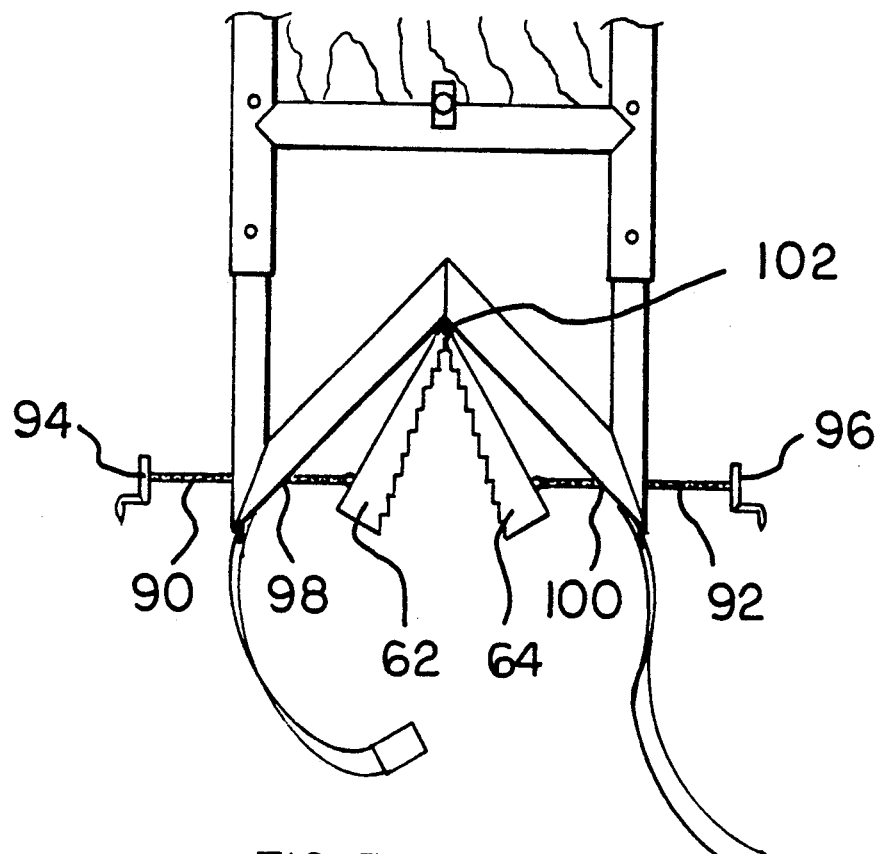
FIG. 5 is a partial front elevation view of a second embodiment of the invention.
Figure 6:
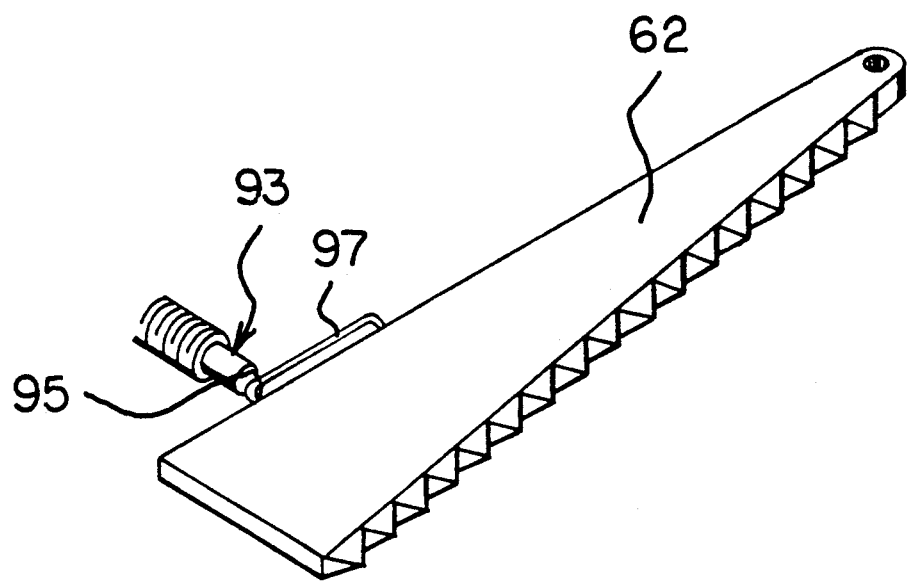
FIG. 6 is a detail perspective view of the second embodiment.

Referring to FIGS. 5 and 6, it can be seen in a second embodiment of the invention that the serrated blades 58-64 may be pivotally attached to the interior of the apex formed by respective end members 46, 48 and 50, 52 to allow for a decrease in the interior angle formed by the serrated blades to facilitate the reception of various diameter supporting trees 84, as well as to create clamping pressure around a supporting tree which will improve the stability of the tree seat 10.

Symmetrically positioned at both ends of the invention 10, but pictured on only one end in FIG. 5, the serrated blades 62, 64 are pivotally attached to the frame 12 by a hinge 102, and they are also engaged to respective screw rods 90, 92 through a rotating rod end 93 and an elongated link 97. The rod end 93 is sized to capture the end of the screw rod 90 while allowing for the rotation of said screw rod upon ball bearings (not shown) contained within the rod end. Additionally, the rod end 93 is assembled to the screw rod 90 in such a manner as to facilitate a permanent, rotating couple. The rod end 93 anchors a semicircular link 95 interconnected with an elongated link 97 that is attached to the serrated blade 96, thereby allowing relative longitudinal motion between the rod end and the elongated link.

At the outside ends of the screw rods 90, 92 are respective handles 94, 96 utilized to facilitate rotation of the screw rods thereby advancing the screw rods through respective threaded apertures 98, 100 machined into the frame 12. The advancement of the screw rods 90, 92 creates a decrease in the angle formed by the serrated blades 62, 64 allowing the tree seat 10 to facilitate the reception of smaller diameter supporting trees 84 as well as to create clamping pressure around a supporting tree which will improve the stability of the tree seat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new tree seat comprising:
    a substantially rectangular frame having opposed ends with a V-shaped contour formed in each of said ends, said V-shaped contours lying in a plane and defining a distance therebetween; and,
    two pairs of serrated blades, one of said pairs of serrated blades being coupled to said frame within one of said V-shaped contours, and another of said pairs of serrated blades being coupled to said frame within another of said V-shaped contours, each of said pairs of serrated blades being arranged to form an angle between each serrated blade, and means for changing said distance between said V-shaped contours.

2. The new tree seat of claim 1, and further comprising a means for decreasing said angle between at least one of said two pairs of serrated blades.

3. The new tree seat of claim 2, wherein said frame comprises a pair of substantially parallelly aligned main support members connected together by at least one cross member, and further wherein said means for changing said distance between said V-shaped contours comprises a pair of sliding frame members, one of said sliding frame members being telescopically received within one of said main support members, and another of said sliding frame members being telescopically received within another of said main support members.

4. The new tree seat of claim 3, wherein said means for decreasing said angle between at least one of said two pairs of serrated blades comprises a hinge for pivotally mounting said serrated blades to said frame; and at least one screw rod threadably and advancably engaged to said frame, said at least one screw rod being rotatably and movably coupled to one of said serrated blades for pivoting said serrated blade relative to said frame.

5. The new tree seat of claim 4 and further comprising straps attached to said frame for encircling a tree.

6. A new tree seat comprising:
    a substantially rectangular frame having opposed ends with a V-shaped contour formed in each of said ends, said V-shaped contours lying in a plane and defining a distance therebetween;
    a seat pivotally attached to said frame;
    at least one folding support brace extending between said frame and said seat for supporting said seat in a support position away from said frame; and,
    two pairs of serrated blades, one of said pairs of serrated blades being coupled to said frame within one of said V-shaped contours, and another of said pairs of serrated blades being coupled to said frame within another of said V-shaped contours, each of said pairs of serrated blades being arranged to form an angle between each serrated blade, and means for changing said distance between said V-shaped contours.

7. The new tree seat of claim 6, and further comprising a means for decreasing said angle between at least one of said two pairs of serrated blades.

8. The new tree seat of claim 7, wherein said frame comprises a pair of substantially parallelly aligned main support members connected together by at least one cross member, and further wherein said means for changing said distance between said V-shaped contours comprises a pair of sliding frame members, one of said sliding frame members being telescopically received within one of said main support members, and another of said sliding frame members being telescopically received within another of said main support members.

9. The new tree seat of claim 8, wherein said means for decreasing said angle between at least one of said two pairs of serrated blades comprises a hinge for pivotally mounting said serrated blades to said frame; and at least one screw rod threadably and advancably engaged to said frame, said at least one screw rod being rotatably and movably coupled to one of said serrated blades for pivoting said serrated blade relative to said frame.

10. The new tree seat of claim 9 and further comprising straps attached to said frame for encircling a tree.

11. A new tree seat comprising:
    a substantially rectangular frame having opposed ends with a V-shaped contour in each of said ends, said V-shaped contours lying in a plane and defining a distance therebetween, said frame including a pair of substantially parallelly aligned main support members connected together by at least one cross member;
    two pairs of serrated blades, one of said pairs of serrated blades being coupled to said frame within one of said V-shaped contours, and another of said pairs of serrated blades being coupled to said frame within another of said V-shaped contours, each of said pairs of serrated blades being arranged to form an angle between each serrated blade;
    a seat pivotally attached to said cross member;

a pair of folding support braces each extending between said frame and said seat for supporting said seat in a support position away from said frame;

means for changing said distance between said V-shaped contours, said means comprising a pair of sliding frame members, one of said sliding frame members being telescopically received within one of said main support members, and another of said sliding frame members being telescopically received within another of said main support members; and, means for decreasing said angle between at least one of said two pairs of serrated blades, said means comprising a hinge for pivotally mounting said serrated blades to said frame; at least one screw rod threadably and advancably engaged to said frame, said at least one screw rod being rotatably and movably coupled to one of said serrated blades for pivoting said serrated blade relative to said frame; and, a handle coupled to said screw rod for effecting a rotation thereof.

12. The new tree seat of claim 11, and further comprising straps attached to said frame for encircling a tree.

* * * * *